April 7, 1953     J. P. BAUER ET AL     2,633,790
ROTARY FLANGED DISK WEED CUTTER Filed Aug. 8, 1949     2 SHEETS—SHEET 1

INVENTORS.
F. LOHR BAUER,
BY JEROE P. BAUER,
Stedman B. Hoar
Agent

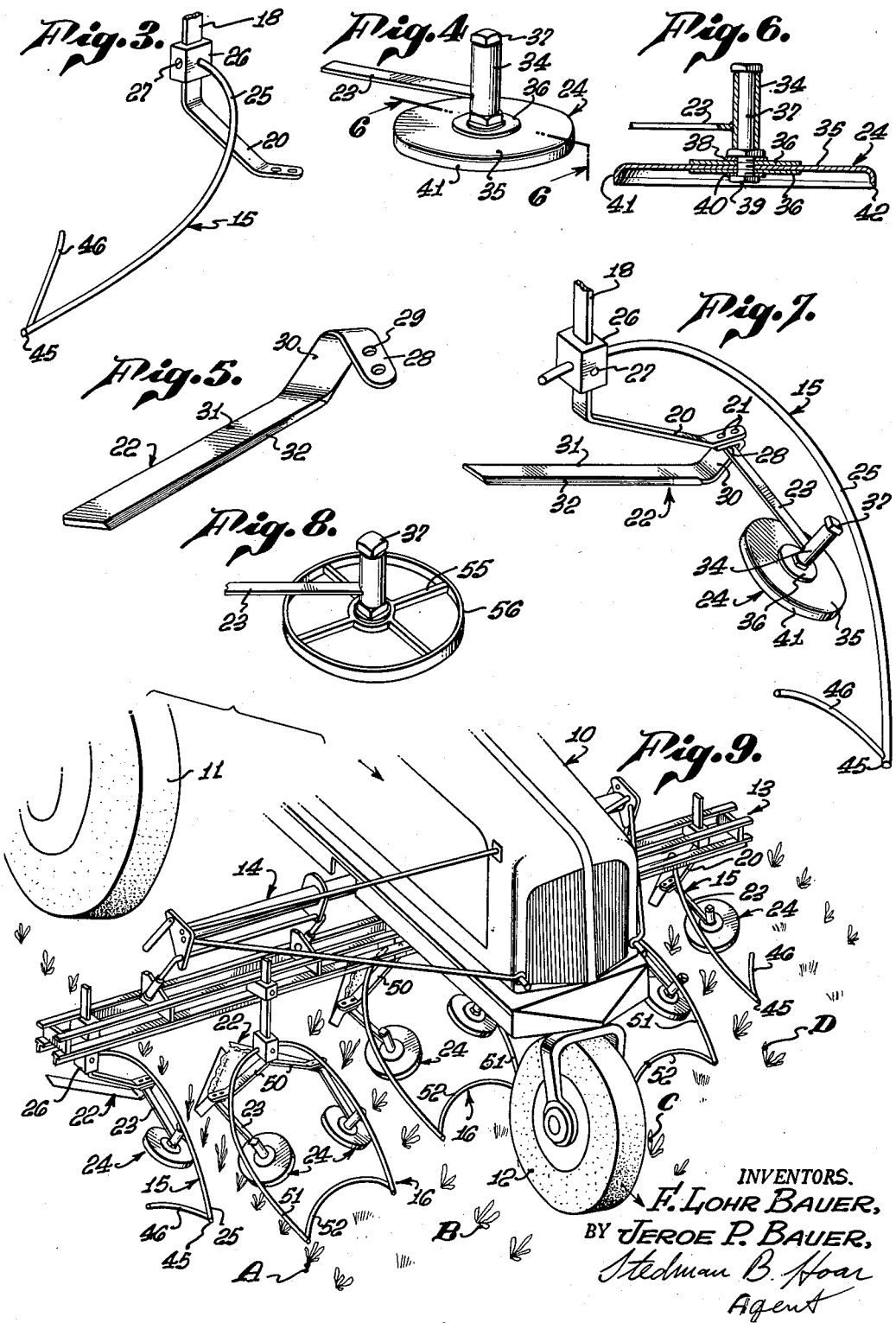

Patented Apr. 7, 1953

2,633,790

UNITED STATES PATENT OFFICE 2,633,790

ROTARY FLANGED DISK WEED CUTTER

Jeroe P. Bauer and Frank Lohr Bauer, Saticoy, Calif.

Application August 8, 1949, Serial No. 109,213

8 Claims. (Cl. 97—144.1)

This invention relates to a machine for cutting weeds and more particularly to improvements in weed cutters of the vehicular type intended for cultivating row crops such as beans or young corn, and has as an object the provision of weed cutting and pulling means which may be easily attached to existing types of vehicular weed cutters to improve their efficiency and to reduce, if not entirely eliminate, the need for follow-up hoeing.

Vehicular bean weeders ordinarily are provided with knives such as the "Cyclone" or V-knife type, which operate like sub-surface sickles to cut the roots of weeds growing between the crop rows. These knives have substantially horizontal blades suspended from the vehicle, which now usually is a tractor, by a vertical shank which is connected to the cultivator bar of the vehicle. The knives are customarily set in associated and cooperating pairs, each pair weeding the area between two adjacent rows, with the knife shanks set as close to the rows as is possible without encountering the crop foliage and with the knives converging and preferably overlapping and with the distal ends of the blades trailing the shanks so as to produce a slicing cut. Such knives are very effective against weeds rooted in the central part of the space between crop rows, that is, in the path followed by the converging ends of the blades, but the shanks of the knives tend to gather an accumulation of un-cut surface runners and other vegetation which so fouls the ends of the blades adjacent to the shanks as to render them of little use in cutting. Surface runners of weeds rooted in the crop rows may be simply pushed forward along the rows by the knife-shanks, if not fouled thereon, leaving these weeds unharmed and in full vigor. Consequently, for efficient weeding, a great deal of hand-hoeing close to the crop-rows is necessary, and frequent stops of the weeding machines are required to permit removal of weed masses entangled on the knife-shanks.

It is, therefore, a specific object of our invention to provide a weed-cutting device which will cut weed-runners along the paths to be followed by the aforesaid knife-shanks and which will pull the cut runners from the paths of the shanks so as to obviate fouling.

Another object of the invention is to provide weed cutting means adapted to cut the runners and foliage from weeds growing in, or very close to, the crop rows, so as to leave these weeds weakened and destroyed to an extent at which they do not menace the crops.

A more detailed object is to provide a cultivating implement which by rotary movement of a circular blade produces a hoeing action by which weeds not readily accessible to the usual cutting blades of cultivators may be either pulled or cut, or both, so as largely to eliminate hand-hoeing.

Our invention has other inherent objects and advantages which will be pointed out as the following description of a preferred embodiment of the invention proceeds, or will be apparent from consideration of the accompanying drawings, illustrative of that embodiment, in which:

Fig. 3 is a perspective view of means for attaching the weed cutting apparatus to a cultivator bar, a vine-guard for lifting crop foliage from the path of the cutting apparatus being shown associated therewith;

Fig. 4 is a perspective view of a preferred form of cutter and puller to be associated with one of the aforesaid knives;

Fig. 5 illustrates a typical knife;

Fig. 6 is a vertical sectional view taken on the plane of section indicated by the line 6—6 of Fig. 4, showing resilient and rotative mounting for the cutter and puller.

Fig. 7 shows the parts illustrated in Figures 3, 4, and 5 assembled as a unit;

Fig. 8 illustrates a modified form of the cutter and puller shown in Fig. 4; and Fig. 9 is a perspective view in which the individual and cooperative functions of the constituent parts of the unit are illustratively made clear.

Figure 1:
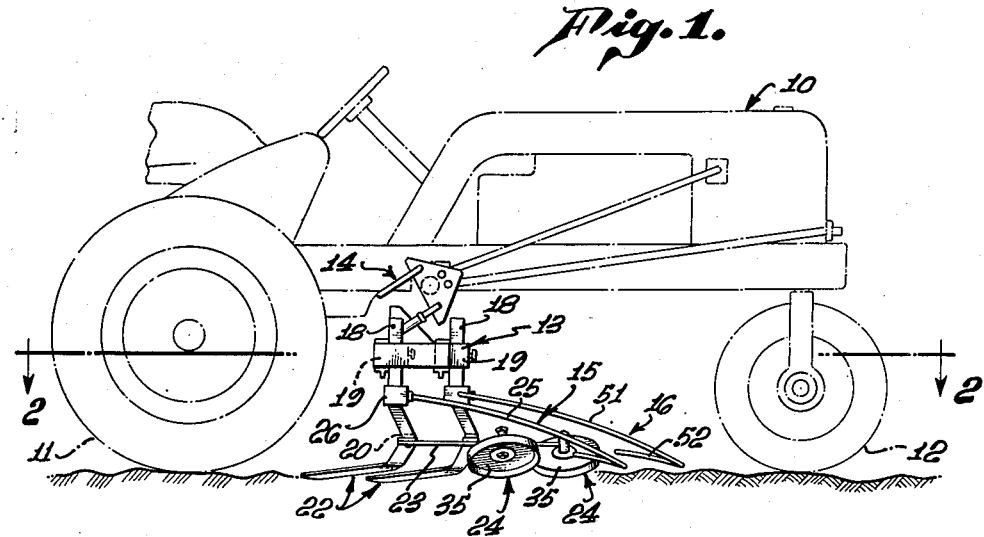
Fig. 1 is a side elevational view of weed cutting apparatus according to our invention, the apparatus being illustrated as attached to the cultivator bar of a tractor.

Broadly described, our invention comprises a weeding unit which includes one or more knives for sub-surface cutting of weed-roots, and arranged to have the knife blades follow paths parallel to but laterally spaced from the blade supports, a rotary circular weed cutter and puller travelling in advance of each knife for moving weeds from the path of the blade supports into the path of the blade; and in its preferred form, a guard arm travelling in advance of the rotary cutter for lifting the foliage of crop plants out of the path of the rotary cutter. The weeding unit may comprise one of each of the above-mentioned elements, or two of each of them; in the first instance being adapted for weeding one side of a crop row, and in the second instance being adapted to cultivate the area between two adjacent crop rows. The rotary cutter differs materially from the ordinary disk cutter or harrow-blade, in that its cutting edge is not in the plane of rotation but is on a margin of an annular band at substantially a right angle to the plane of rotation. The rotary cutter may be aptly called a circular hoe in that its action involves furrowing and scraping and pulling as well as slicing. Weeding units as above broadly described may be attached by suitable means to any suitable vehicle, either as single units or double units, a particular form of attachment to a tractor being hereinafter described in detail.

Having reference now to the details of the drawings, we have shown as a vehicle suitable for equipment with our weed-cutting apparatus, a tractor 10, having two traction wheels 11 and one front wheel 12, such a tractor being of conventional type for agricultural work and particularly suited for cultivating row-crops in that the traction wheels 11 ordinarily straddle two rows of plants while the front wheel 12 runs between the same rows. A single or double cultivator bar 13 (a double bar is illustrated) is usually standard equipment on farm tractors for supporting cultivating instruments of various kinds, and is provided with suitable lifting apparatus 14 by which the bar may be adjusted in height or raised to carry the cultivating instruments clear of the ground. It is to be understood that our weed cutter may be attached to vehicles of other types than that herein illustrated, the particular form here shown being selected only because of its common usage.

The cultivator bar 13 may suitably extend laterally beyond the plant-rows outside the rear wheels 11, thus permitting cultivating instruments carried by the bar to apply to any convenient number of rows. We have shown, in Figs. 2 and 8, a tractor having a double bar 13 overlaying four rows of plants, such as beans, designated A, B, C, and D from right to left in the direction of travel of the tractor, and with our improved weeding units attached to both forward and rearward rails of the bar, single units 15 being attached to the ends of the bar to cultivate the outer sides of rows A and D, and double units 16 being attached between the units 15 to cultivate the inner side of row A and the adjacent side of row B, the other side of row B and the adjacent side of row C, and the other side of row C and the adjacent inner side of row D. The double construction of the bar 13 permits the units 15 and 16 to be staggered forwardly and rearwardly, thus providing greater space and accessibility.

The single weeding unit 15, illustrated in Fig. 7 in assembly and in Figures 3, 4 and 5 in its several parts, may be mounted on the bar 13 by a post 18, held to the bar by a suitable clamp 19. The lower portion 20 of the post 18 is bent laterally and downwardly and has attached to its end, as by bolts 21, a knife 22 and a forwardly extending spring arm 23 which carries at its forward end a circular cutter or hoe 24. A guard arm 25 is secured to the upper part of the post 18 by means of a block 26 and set-screw 27 and extends forwardly therefrom beyond the circular cutter 24.

The knife 22 (see Figures 5 and 7) may be formed of a single piece of twisted metal, and has a flat upper end 28 provided with holes 29 for the bolts 21 by which it is secured to the post arm 20. From the end 28, the knife is bent to extend downwardly in a shank 30, at the lower end of which it is bent again to extend substantially horizontally and diagonally rearwardly with reference to the tractor, to form a blade 31 sharpened on its forward edge 32.

The knife will, in operation, be held by the lifting apparatus 14 at a level slightly below the surface of the ground, with the shank 30 thrust into the soil and the blade 31 being pulled through the soil and held at an angle to its direction of travel so as to effect a slicing cut upon weed roots.

The spring arm 23 may be a flat piece of spring steel held at its proximal end to the post arm 20 by the bolts 21 and having a tubular bearing 34 welded or otherwise secured to its distal end. The circular cutter 24 is preferably a pan-shaped disc 35 which may have reinforcing washers 36 (Fig. 6) on its inner and outer sides at its center. A bolt 37 extending through the tubular bearing 34, an end bearing washer 38, and the reinforcing washers 36, and secured by a nut 39 and lock washer 40, serves as a stub shaft to mount the cutter 24 rotatably in the bearing 34. The rim of the pan-shaped disc 35 forms an annular flange or band 41 substantially at a right angle to the plane of rotation of the cutter and thin in its radial dimension. It will be seen that the preferred method of mounting the cutter 24 on the spring arm 23 is simple and permits easy removal and substitution of cutters if they become damaged. The edge 42 of the band 41 may be sharpened, but as will be explained hereinafter, a dull band will be serviceable for weeding in circumstances frequently encountered.

The spring arm 23 is inclined downwardly and forwardly to bring the bearing 34 in the path to be followed by the knife blade 31, and is tilted to cant the bearing 34 slightly from the vertical, the upper end of the bearing being inclined laterally towards the path to be followed by the knife shank 30. The plane of rotation of the cutter 24 is accordingly canted from the horizontal. The tilt and direction of the spring arm 23 and the diameter of the cutter 24 are such that the lower segment of the cutter is substantially at ground level and extends to or just beyond the path to be followed by the knife shank 30, so that the band 41 at that point tends to cut a furrow in the ground which the knife shank will follow. It will be apparent that friction with the ground will cause the cutter 24 to rotate and that the upwardly and cycloidally rotating segment of the band 41 will move from the aforesaid furrow out of the path to be followed by the knife shank into the path to be followed by the knife blade 31.

The spring arm 23 is also preferably bent so that the bearing 34 inclines rearwardly as well as laterally, though not to a degree equal to the lateral inclination, thus causing the forward segment of the cutter 24 to be somewhat elevated and the rearward segment to be correspondingly depressed. The purpose of this forward and rearward inclination is two-fold: to allow the cutter to move easily to surmount an obstacle, the spring arm 23 then yielding to allow the cutter to rise; and to cause the furrowing segment of the cutter to rise more gradually from the furrow, maintaining contact with the ground until it is well out of the path of the knife shank 30. The lowest point of the cutter will be slightly rearward of the bearing 34, and a wider furrow will be plowed for the knife shank to follow, and a greater dragging and scraping force will be exerted than if the low point of the cutter were abreast of the bearing 34. The resemblance to the action of a hoe thus obtained will be apparent.

To avoid the multiplicity of illustration which would be required to illustrate operation under all terrain conditions, the inclination of the cutter 24 has been recited as relative to the vertical and horizontal, as it obviously would be when cultivating horizontal terrain. It will be equally obvious that it is actually the angular contact with the terrain that causes the cycloidal hoeing action of the cutter 24, and that for cultivating inclined terrain surfaces such as hillsides or raised crop rows the cutter 24 may be secured to its wheeled support so that it is at any necessary angle to the horizontal but at an acute lateral angle to the terrain.

The guard arm 25 extends forwardly and downwardly from the post 18 to a point in advance of the cutter 24 and just above ground level. The arm 25 is curved so that its most outlying part is substantially aligned in the direction of travel with the furrowing segment of the cutter 24, while its end 45 is turned inwardly toward the center of the cutter. A finger 46 curves rearwardly and inwardly from the arm end 45 across the path of the cutter. The function of the guard arm 25 is to lift the foliage of crop plants above the cutter 24 and above the knife shank 30 while permitting weed surface runners to pass under it undisturbed.

Figure 2:
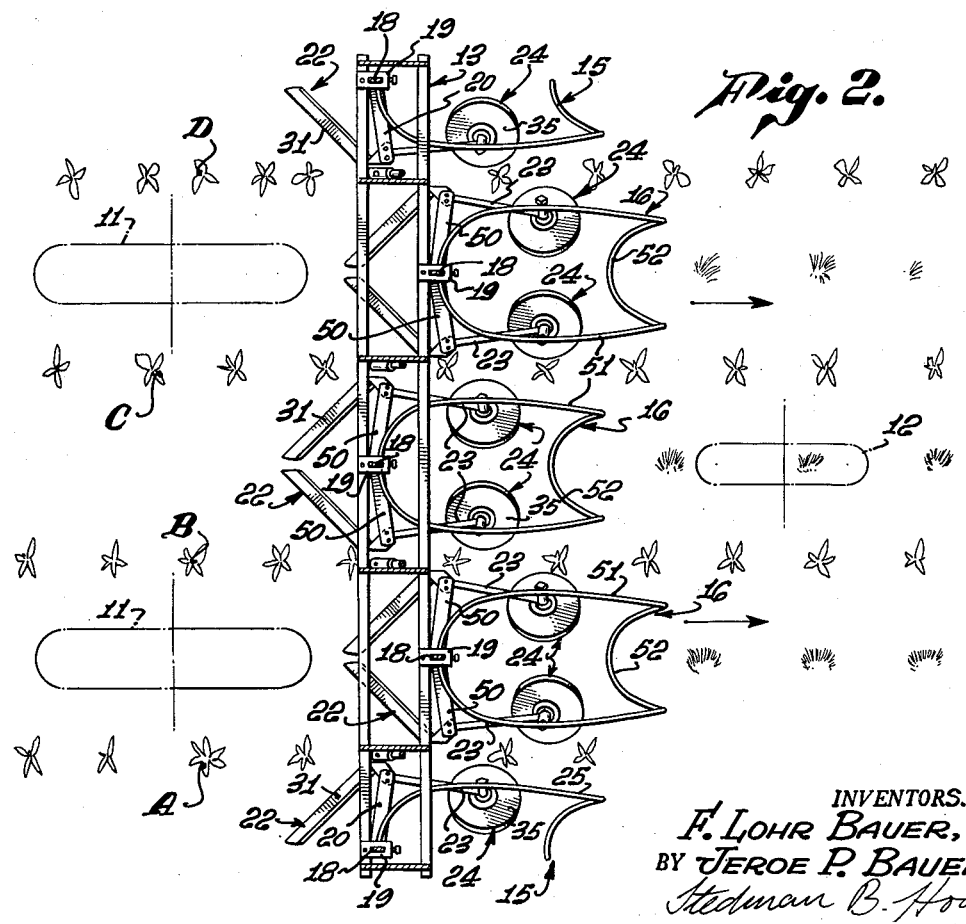
Fig. 2 is a horizontal sectional view taken through the tractor at a level just above the cultivator bar, the plane of section being indicated by the line 2—2 of Fig. 1, and showing how our improved weeding apparatus may be attached to a tractor in multiple to cultivate a plurality of crop rows.

The double weeding unit 16, as shown in Figures 2 and 9, is substantially the same as the single unit 15 in principles of construction, the parts being in duplicate. The post 18 has two laterally and downwardly extending arms 50, instead of one arm, each of the arms 50 supporting as hereinbefore described a knife 22 and a spring arm 23 carrying a circular cutter 24. A double guard arm 51 is attached to the post 18 by the block 26, having the form of a bow held at its center by the block 26 and its two ends leading forward in advance of the cutters 24. Fingers 52, corresponding to fingers 46 on the single guard arm, are preferably joined to make a more rigid and protective structure.

In Fig. 8, we have illustrated a modified form of circular cutter in which a spider 55 replaces the disk 35. The spider may be rotatably mounted on the distal end of the spring arm 23 in the same manner as the disk 35, and carries an annular band 56 having the same function as the flange 41. The spider 55 has the advantage of making the assembly nut 39 somewhat more accessible, and the bands 56 need not be integral with the spider but may be suitably secured thereto for ready removal and replacement. The spider 55 would not ordinarily be used in cultivation of crops having low foliage except in combination with guard arms 25 or 51, in order to prevent entanglement of the foliage in the legs of the spider. Either type of circular cutter is a bladed wheel mounted upon an inclined bearing, and our invention is held to include other types of bearings and hub constructions.

As hitherto described and as shown in Figures 2 and 8, our weed cutter may be operated to cut and pull weeds from a plurality of rows of crops at one time. The weed cutting units 15 and 16 may be adjusted lengthwise of the cultivator bar 13 in the ordinary manner of cultivating tools, and the bar may be adjusted in elevation by the adjusting mechanism 14 to bring the knife blades 31 just below the ground level. As the tractor proceeds along the crop rows, the guard arms 25 or 51 lift the foliage of the crop plants, the leaves and branches sliding upwardly along the guard arms until the circular cutters and knives have passed beneath. The cutters 24, held in contact with the ground by the spring arms 23, incline under the upraised foliage toward the stalks of the plants, and are caused to rotate by ground friction acting upon their flanges or bands 41 or 56. The flanges or bands plow furrows close to the plant stalks, cutting off the weed surface runners which lie in their path. Some of these runners may originate from weeds growing between plants in the same row; such plant weeds are left in weakened condition and will not ordinarily require hoeing. The severed runners from these weeds are pulled by the bands 41 or 56 out of the paths of the oncoming knife shanks 30 so that the shanks are not fouled. Some of the weed runners will originate from weeds growing between crop rows. The severed distal ends of these runners will be left to wither between rows, and the proximal ends will be pulled from the paths of the knife shanks. The weed roots from which these proximal runner ends grow will be cut efficiently by the knife blades 31, now free of encumbering runners which formerly were collected by the knife shanks 30 and which slid therefrom across the blades. If the weeds are young and their runners have not become entwined in the crops, it will be found unnecessary to maintain the edges 42 in sharp condition. The twisting, pulling action of the rotating bands 41 will pull loose runners into clumps which will follow the cycloidal path of the band 41. When the runners are released, they will lie more or less parallel to the path of the tractor, as if raked, and in the paths of the knife blades 31, not the paths of the knife shanks 30. The elimination of even such persistent weeds as morningglory vines may be thus accomplished without hoeing.

For use against stalk weeds not having surface runners, our improved weed cutter is also unusually effective. The inclined circular cutters 24 reach areas beneath the foliage of the crop plants which can not be entered by a horizontal knife blade without danger of severing crop roots. The danger that the knife shank, fouled by roots, will plow a furrow wide enough to expose crop roots close to the plants, is also obviated.

Obviously, our invention is subject to modifications in form and arrangement which may occur to those skilled in the art, without departure from the spirit of our invention; therefore, we do not wish to be limited to the exact exemplification herein described and illustrated, but rather to the scope of our invention as set forth in the appended claims.

We claim:

1. In a weed cutter for cultivating plants set in rows, said cutter moving parallel to said rows, a cutting unit comprising in combination: guard means forwardly and downwardly inclined for lifting the foliage of said plants from the path of said unit; revolvable means for pulling weeds, disposed rearwardly of said guard means and inclusive of a downwardly extending annular flange, said revolvable means being canted from the horizontal laterally and downwardly toward said plants to permit the lower lateral segment of said flange to enter the ground to cause rotation of said means, the flange then moving from the ground cycoidally away from said plants to pull weeds away from the stalks of said plants, said flange having a sharp lower edge for cutting runners of said weeds; spring means urging said revolvable means into contact with the ground and yieldable to permit said cutting means to rise to pass an obstruction; support means trailing said revolvable means substantially in the path of said lower lateral segment; and cutting means supported by said support means and extending laterally therefrom across the path of said revolvable means.

2. In a weed cutter: a cutting unit as set forth in claim 1, in which each of the elements therein described is in duplicate, said duplicate elements being arranged oppositely for cultivation of adjacent sides of adjacent rows of plants.

3. In a weed cutter: a plurality of cutting units each comprising, in combination, a knife having its blade arranged to deliver a horizontal slicing cut at or below the ground level and having a shank for supporting said blade disposed at one side of the path of said blade, and a circular cutter mounted to rotate about an axis slightly inclined from the vertical and so disposed that the lower segment of said circular cutter is in contact with the ground in the path to be followed by said shank, and the higher segment thereof is above the ground and in the path to be followed by said blade, said circular cutter having a peripheral flange on its lower side; some of said cutting units being arranged in duplicate with the knives and circular cutters thereof extending oppositely for cultivation of adjacent sides of adjacent rows of plants, said duplicate units having single support means for connecting them to said weed cutter.

4. In a weed cutter, a cutting unit comprising in combination, a knife having its blade arranged to deliver a horizontal slicing cut at or below the surface of the ground and having a shank for supporting said blade disposed at one side of the path of said blade; a pan-shaped disk mounted rotatably in the path of and in advance of said blade and canted so that a lower lateral segment of said disk is disposed substantially at ground level in the path to be followed by said shank; the rim of said pan-shaped disk extending downwardly substantially parallel to the axis of rotation of said disk to furrow the ground in advance of said shank, and by friction with the ground to cause rotation of said disk and to exert a cycloidal inward pull; and means for supporting said disk arranged to yield to upward pressure against said disk such as might be exerted by an obstruction.

5. In a weed cutter: means for cutting weed roots in a horizontal plane below the ground level; support means for said cutting means; and a circular cutter carried by said weed cutter in advance of said support means and having a substantially even cutting edge rotatable in a plane such that the cutting edge of said cutter moves transversely of the path to be followed by said support means for cutting and moving surface-growing vegetation from said path, said cutting edge being perpendicular to the plane of rotation.

6. In a weed cutter: means for cutting weed roots in a horizontal plane below the ground level; support means for said cutting means; a resilient arm connected to said support means and extending forwardly thereof; and a circular hoe rotatably carried by said arm and urged by said arm to make contact with the ground in advance of said support means in the path to be followed by said support means; said hoe rotating in a plane slightly inclined from the horizontal and having a downwardly-turned sharp edge.

7. In a weed cutter, in combination with a cutting instrument having a downwardly extending shank and a blade attached to said shank for cutting vegetation at or below the surface of the ground: a thin and relatively wide annular band carried rotatably by said weed cutter in advance of said cutting instrument and having its width parallel to its axis of rotation and so disposed and so inclined from the horizontal as to cause rotation of said band by engagement of the lower rim of a lateral segment of said band with the ground substantially in the path to be followed by said shank, said band rotating from its point of engagement with the ground upwardly and cycloidally and out of the path of said shank so as to pull vegetation runners engaged by said segment from the path of said shank; and resilient means yieldably urging said band into contact with the ground.

8. A weed cutter adapted for movement along a row of plants, comprising: a wheel rotatable in a plane inclined at an acute angle to the terrain, the lower segment of said wheel extending towards said plants; a sharp annular blade having a continuous cutting edge on the lower side of said wheel substantially perpendicular to the plane of rotation of said wheel; and resilient means connected with said wheel urging said blade into contact with the ground, whereby said wheel is caused to rotate, said blade then moving from its point of contact with the ground on a cycloidal path from said plants so as to hoe weeds in the direction of said path.

JEROE P. BAUER.
F. LOHR BAUER.

REFERENCES CITED

The following references are of record in the file of this patent:

UNITED STATES PATENTS

| Number | Name | Date |
|---|---|---|
| 889,486 | Ross | June 2, 1908 |
| 1,480,996 | Coppinger | Jan. 15, 1924 |
| 1,563,765 | McCready | Dec. 1, 1925 |
| 1,757,858 | Groeneveld et al. | May 6, 1930 |
| 2,052,802 | Schatz | Sept. 1, 1936 |
| 2,061,694 | Cuddigan | Nov. 24, 1936 |
| 2,205,188 | Cuddigan et al. | June 18, 1940 |
| 2,225,516 | Audilet | Dec. 17, 1940 |